UNITED STATES PATENT OFFICE 2,401,429

PROCESS FOR THE PRODUCTION OF 2-AMINO-CARBOXYLIC ACID NITRILES

Frederick E. Küng, Akron, Ohio

No Drawing. Application August 31, 1942,
Serial No. 456,746

8 Claims. (Cl. 260—464)

This invention relates to a process for the preparation of the class of compounds consisting of 2-amino-carboxylic acids, their esters, nitriles, amides, etc. This invention relates more particularly to a process for the preparation of the class of compounds consisting of 2-amino-carboxylic acids, their esters, nitriles, amides, etc. (all of which are primary amines) from the secondary and tertiary amine corresponding to the desired primary amine.

This invention has as an object the preparation of 2-amino-carboxylic acids, their esters, nitriles, amides, etc., in better yields and at a lower cost than in previously described methods. Another object is to provide economical methods for the preparation of 2-amino-carboxylic acids, their esters, nitriles, amides, etc., by previously known methods which gave a low yield of the primary amine because side reactions led to the formation of the secondary amines and the tertiary amines. Other objects will become apparent from the following description of the invention.

At the present time, of the class of compounds consisting of 2-amino-carboxylic acids, their esters, nitriles, amides, etc., the compound of greatest commercial importance is beta-alanine. It is of importance in the biological field and especially as an intermediate in the preparation of the vitamin, pantothenic acid. Beta-alanine has been prepared by various methods. Among these methods are the action of halogen upon succinimide and the reduction of cyanoacetic acid and its esters. However, none of these methods is very suitable for manufacture on a large scale. Derivatives of beta-alanine have also been prepared by the action of ammonia upon acrylonitrile and acrylic esters. However, the yield of the primary amine is low, with the formation of large amounts of the secondary amine and the tertiary amine. As derivatives of acrylic acid have recently become available at low cost and in large quantities, the preparation of beta-alanine by the action of ammonia upon acrylates becomes more desirable. By the use of this invention the yields can be increased greatly and the process becomes important from a practical point of view.

This invention is based upon the discovery that secondary amines, tertiary amines, the salts of secondary and tertiary amines, and acylated secondary amines derived from 2-amino carboxylic acids, their esters, nitriles, amides, etc., undergo the chemical changes represented by the following equations.

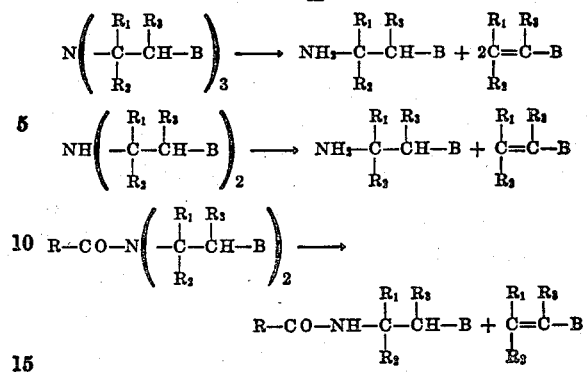

Where B represents —COOH, —COOR$_4$, —CN, —CONH$_2$, etc., and where R, R$_1$, R$_2$, R$_3$, and R$_4$ may be any of the alkyl, aryl, or aralkyl groups or hydrogen.

The salt of a strong acid and the secondary amine (when not acylated) and the salt of a strong acid and the tertiary amine also undergoes this reaction, resulting in the formation of the salt of the primary amine.

The above reaction is brought about under the influence of heat and may be termed a pyrolysis. The pyrolysis may take place in the liquid phase or the vapor phase or both depending upon the specific conditions involved. The pyrolysis may take place at a pressure greater than, equal to, or less than atmospheric pressure depending again upon the specific conditions involved. Generally the pyrolysis will be conducted at atmospheric pressure or reduced pressure. It may be advantageous to remove one or more of the products of the reaction from the reaction zone as rapidly as formed. The pyrolysis may take place in the presence of primary amine without decomposing the primary amine to any great extent. If, as in some cases, one of the products of reaction is capable of polymerization, a polymerization inhibitor may be added if necessary.

As the amino and imino group is fairly reactive, in some applications of this invention a chemical reaction may take place between the amino or imino group and the carboxylic acid group or some of the functional groups derived from the carboxylic acid group. For example, pyrolysis of 2,2'-dicarbomethoxydiethylamine might lead to the formation of a polymeric amide as a concurrent reaction. In cases such as these, the pyrolysis of the acylated secondary amine or the salt of a strong acid and the secondary or the tertiary amine would be preferable to the pyrolysis of the amine itself.

The following examples illustrate specific embodiments of the invention. It is to be understood that the invention is not limited to the following examples but only by the scope of the appended claims.

Example 1

A mixture of 200 g. (3.8 moles) of acrylonitrile and about .5 l. of liquid ammonia was placed in a Dewar flask and fitted with a reflux condenser cooled by Dry Ice. After 7 hours the condenser was removed, and the mixture was allowed to stand in the Dewar flask 2 days. On distillation 39 g. of crude 2-cyanoethylamine (30 g. on redistillation B. P. 90°₂₂) and 176 g. of 2,2'-dicyanodiethylamine (B. P. 205°₃₅) were obtained.

126 g. (1.02 moles) of 2,2'-dicyanodiethylamine was distilled at atmospheric pressure in 35 minutes. The temperature of the distillate was 200° to 230° C. The condensate was distilled at reduced pressure. The yield of 2-cyanoethylamine was 46% (33 g.).

Example 2

50 g. (.4 mole) of 2,2'-dicyanodiethylamine was cautiously treated with 50 g. of acetic anhydride. The mixture was distilled at 200° to 265° C. at 26 mm. The condensate was redistilled at 230° to 250° C. at 70 mm. to 90 mm. The condensate was then redistilled at 23 mm. 17 g. of material (B. P. 187° to 200° and M. P. 63°) were obtained; the material must be N-(2-cyanoethyl) acetamide. (A purer sample of N-(2-cyanoethyl) acetamide obtained by the acetylation of 2-cyanoethylamine had a boiling point of 190°₂₂ and a melting point of 65° C.)

On hydrolysis of N-(2-cyanoethyl) acetamide with aqueous alkali, a good yield of beta-alanine was obtained.

Example 3

100 g. (1.9 moles) of acrylonitrile was reacted with ammonia as in Example 1. After driving off the unreacted ammonia and without fractionating to separate the primary amine, the whole reaction product was distilled at atmospheric pressure at 200° to 230° C. The condensate was redistilled at reduced pressure. A 26% yield (36 g.) of 2-cyanethylamine was obtained.

On hydrolysis of 2-cyanoethylamine with aqueous alkali, a good yield of beta-alanine was obtained.

Example 4

100 g. (1.9 moles) of acrylonitrile was reacted with ammonia as in Example 1. The excess ammonia was driven off by heating, and the residue was carefully treated with 110 g. (1.08 moles) of acetic anhydride. The reaction product was distilled to remove the acetic acid and any excess acetic anhydride. The residue was slowly distilled at 30 mm. to 70 mm. pressure. On redistilling the condensate, the yield of N-(2-cyanoethyl) acetamide was 40% (85 g. M. P. 63.5° C.).

Example 5

120 g. (1.4 moles) methyl acrylate was treated with 170 g. (10 moles) of liquid ammonia as in Example 1. The excess ammonia was removed and the residue was treated with 122 g. (1.2 moles) of acetic anhydride. The reaction product was then distilled and redistilled. A fair yield of N-(2-carbomethoxyethyl) acetamide was obtained.

I claim:

1. The process which comprises pyrolyzing the reaction product of ammonia and acrylonitrile, and thereby converting the 2,2'-dicyanodiethylamine and the 2,2',2''-tricyanotriethylamine to 2-cyanoethylamine, and so greatly increasing the yield of 2-cyanoethylamine.

2. The process which comprises pyrolyzing 2,2'-dicyanodiethylamine to form 2-cyanoethylamine.

3. The process which comprises pyrolyzing 2,2',2''-tricyanotriethylamine to form 2-cyanoethylamine.

4. The process which comprises pyrolyzing an organic amine formed from ammonia by replacement of at least two hydrogen atoms by 2-cyanoethyl radicals to produce acrylonitrile and 2-aminopropionitrile.

5. The process which comprises pyrolyzing the reaction product of ammonia and acrylonitrile while continuously removing at least one of the products of reaction and thereby converting the 2,2'-dicyanodiethylamine and the 2,2',2''-tricyanotriethylamine to 2-cyanoethylamine and so greatly increasing the yield of 2-cyanoethylamine.

6. The process which comprises pyrolyzing 2,2'-dicyanodiethylamine to form 2-cyanoethylamine while continuously removing at least one of the products of reaction.

7. The process which comprises pyrolyzing 2,2',2''-tricyanotriethylamine to form 2-cyanoethylamine while continuously removing at least one of the products of reaction.

8. The process which comprises pyrolyzing an organic amine formed from ammonia by the replacement of at least two hydrogen atoms by 2-cyanoethyl radicals to produce acrylonitrile and 2-aminopropionitrile while continuously removing at least one of the products of reaction.

FREDERICK E. KÜNG.